US010033744B2

(12) United States Patent
Chazan et al.

(10) Patent No.: US 10,033,744 B2
(45) Date of Patent: Jul. 24, 2018

(54) SYSTEM AND METHOD FOR CERTIFYING INFORMATION

(71) Applicant: ETEAM SOFTWARE PTY LTD, North Sydney, New South Wales (AU)

(72) Inventors: Mark Mervyn Chazan, St Ives (AU); Michael Kontorovich, Maroubra (AU)

(73) Assignee: eTeam Software Pty Ltd, North Sydney, New South Wales (AU)

( * ) Notice: Subject to any disclaimer, the term of this patent is extended or adjusted under 35 U.S.C. 154(b) by 0 days.

(21) Appl. No.: 15/028,343

(22) PCT Filed: Oct. 22, 2014

(86) PCT No.: PCT/AU2014/001001
§ 371 (c)(1),
(2) Date: Apr. 8, 2016

(87) PCT Pub. No.: WO2015/058243
PCT Pub. Date: Apr. 30, 2015

(65) Prior Publication Data
US 2016/0255099 A1 Sep. 1, 2016

(30) Foreign Application Priority Data
Oct. 22, 2013 (AU) ................ 2013904074

(51) Int. Cl.
H04L 29/06 (2006.01)
H04L 9/32 (2006.01)
(Continued)

(52) U.S. Cl.
CPC ............. H04L 63/123 (2013.01); H04L 9/14 (2013.01); H04L 9/30 (2013.01); H04L 9/321 (2013.01);
(Continued)

(58) Field of Classification Search
CPC ... H04L 63/123; H04L 63/06; H04L 63/0428; H04L 9/3263; H04L 9/30; H04L 9/14; H04L 9/3247; H04L 9/321; H04L 9/3228
See application file for complete search history.

(56) References Cited

U.S. PATENT DOCUMENTS 7,577,425 B2 * 8/2009 Okazaki .............. H04L 63/0823
380/281
8,086,867 B2 * 12/2011 Freeman .............. G06Q 20/341
380/28
(Continued)

FOREIGN PATENT DOCUMENTS

EP 1376925 A2 1/2004
WO WO 2005/101978 A2 11/2005
(Continued)

OTHER PUBLICATIONS

International Search Report dated Nov. 13, 2014 in International Application No. PCT/AU2014/001001, filed Oct. 22, 2016.
(Continued)

Primary Examiner — Morshed Mehedi
(74) Attorney, Agent, or Firm — Knobbe, Martens, Olson & Bear, LLP

(57) ABSTRACT

A method for certifying information about a subject entity, where the subject entity has trusted information associated with them, which is stored at one or more trusted entity computing systems, comprising the steps of a certifying entity obtaining information from one or more trusted entity computing systems, selecting trusted information from the obtained information, and certifying the trusted information as being from the trusted entity computing system and has not been modified.

19 Claims, 6 Drawing Sheets

(51) Int. Cl.
  *H04L 9/14* (2006.01)
  *H04L 9/30* (2006.01)
(52) U.S. Cl.
  CPC .......... *H04L 9/3228* (2013.01); *H04L 9/3247* (2013.01); *H04L 9/3263* (2013.01); *H04L 63/0428* (2013.01); *H04L 63/06* (2013.01)

(56) References Cited

U.S. PATENT DOCUMENTS

| | | | | |
|---|---|---|---|---|
| 2002/0162003 | A1* | 10/2002 | Ahmed | G06F 21/33 713/176 |
| 2003/0163708 | A1* | 8/2003 | Tang | G06Q 20/341 713/185 |
| 2003/0233542 | A1 | 12/2003 | Benaloh | |
| 2004/0181665 | A1* | 9/2004 | Houser | G06Q 40/02 713/158 |
| 2005/0278787 | A1* | 12/2005 | Naslund | G06F 21/10 726/26 |
| 2006/0190986 | A1* | 8/2006 | Mont | H04L 41/0893 726/1 |
| 2007/0136817 | A1* | 6/2007 | Nguyen | G06F 21/10 726/26 |
| 2007/0220009 | A1* | 9/2007 | Morris | G06F 21/6218 |
| 2008/0140442 | A1* | 6/2008 | Warner | G06Q 20/10 705/26.41 |
| 2010/0263051 | A1* | 10/2010 | Ngalle | G06F 21/51 726/26 |
| 2011/0145570 | A1* | 6/2011 | Gressel | H04L 63/0421 713/159 |
| 2012/0030471 | A1* | 2/2012 | Li | H04L 9/321 713/176 |
| 2013/0205135 | A1* | 8/2013 | Lutz | G06F 21/6245 713/165 |
| 2014/0108821 | A1* | 4/2014 | Lloyd | H04L 63/0823 713/189 |
| 2014/0173686 | A1* | 6/2014 | Kgil | H04L 63/205 726/1 |

FOREIGN PATENT DOCUMENTS

| | | |
|---|---|---|
| WO | WO 2008/020991 A2 | 2/2008 |
| WO | WO 2009/065428 A1 | 5/2009 |

OTHER PUBLICATIONS

European Search Report dated May 4, 2017, in corresponding European Application No. 14855601.2 filed Oct. 22, 2014.

* cited by examiner

SYSTEM AND METHOD FOR CERTIFYING INFORMATION

FIELD OF THE INVENTION

The present invention relates to a system and a method for certifying information, and, particularly, but not exclusively, to a system and method for certifying information in order to facilitate verification of information about a person, such as the person's identity.

BACKGROUND OF THE INVENTION

With the expansion of internet services and computer technology, particularly in the social media and financial services space, there has been a growth in financial and identity fraud across a wide range of areas. It has become extremely easy to produce counterfeit or altered documents using easily accessible, cheap home computers and printers, for example. Whilst there are various manual processes and electronic methods that have been put in place to attempt to detect these frauds, they are either extremely labour intensive and thus expensive or require significant expensive changes to virtually all trusted systems of all relevant providers. Some illustrative examples of the problems posed are:

1. A user registers with an online dating site, puts in various details that purport to describe the person. A second user is matched to that person through the dating site algorithms. The two users agree to meet. The users have no way of knowing until they physically meet, that the details about the other person are correct including the most important detail i.e. is the name in the system their true name.
2. A user registers on a social media site such as Facebook. They choose to register under a name that is not theirs but instead choose to impersonate some other person. They are then accepted as a "friend" by all those that know the person being impersonated. This is very dangerous as the people simply accept their "friend" into their private circle and have no way of reliably validating their identity. In an extreme case, recently in the US, a person who met with their imposter "friend" was murdered by that person.
3. "Twitter"™ is a communications channel whereby people sign up as a particular person or company representative and other members who either know or are interested in reading their comments ("tweets") then choose to "follow" them. The followers typically have no way of verifying the identity of the person they are "following" so cannot tell if the person is an imposter. This lack of verification can lead to serious consequences if a user is impersonating a significant/famous/respected person or company. There have been numerous cases of people fraudulently producing "tweets" whilst impersonating someone else. Such fraudulent "tweets" can e.g. cause dislocation in financial markets if e.g. a "tweet" from a supposedly "trusted" source posts false information regarding market sensitive financial or other data relating to a company or country. E.g. a post that a key founder in a company has died can cause shares to be sold in the company in fractions of a second driven by high frequency trade algorithms run by major institutions that automatically react to headlines.
4. In the financial sphere, if a person wishes to e.g. apply for a loan either online or offline, the provider of the loan will require the applicant to provide proof of identity. Due to the ease of document fraud and manipulation, it is not possible for the provider to accept e.g. an emailed document or copy of their passport/driver's license/bank statement etc. Typically they therefore require the applicant to produce those documents at a physical branch in person where the photo can be compared to the person supplying the documents and the physical original documents can be sighted and handled to minimize the chance that they are fraudulent.

The above are just some examples of the problems which could be addressed if a convenient and reliable system and method for certifying information associated with a person, such as a person's identity, could be implemented. There are also many other examples and applications where it would be useful and important to be able to provide verified information about a person.

There are trusted entities such as financial institutions who by law are required to "know their customer" before allowing the user to open an account. These and other institutions e.g. government agencies, therefore ensure that significant checks are in place before accepting a customer's identity. It follows, therefore, that the identity of a user who has an account with such a trusted entity is known to an extremely high level of certainty. Any other information about the user or associated with the user which may be stored by that trusted entity is also likely to have a high level of certainty that the information is correct.

If access could be allowed to this "trusted information" by somebody who wishes to obtain trusted information associated with a person (e.g. to verify their identity), then this may be sufficient verification for the relying party. Such trusted entities as financial institutions, government agencies and others, however, have strict security and privacy requirements and will not allow third parties, such as people who wish to obtain information about an account holder, access to their systems. Further, without the implementation of expensive processes and infrastructure, the trusted entities will not provide certified trusted information to the third parties. It is impractical for them to do so.

A person who has the information associated with them stored at the trusted entity can access their account and obtain the information. They could then forward that information onto a relying party. The relying party, however, could not be certain that the information forwarded by the person was not tampered with or changed, or was genuinely from the trusted entity. In all currently known systems whereby the data is retrieved by the person on their client device manually or through using any known and/or available software, there is no way of guaranteeing that the data that is ultimately forwarded to the relying party has not been modified. This is due to the fact that the data and/or software is exposed to the person accessing their account. Client based software may attempt to obscure, encrypt or hide the data from the user to make it more difficult for the user to modify it before it is sent to the relying party, but the fundamental issue remains that anything that passes through the user's hands could be manipulated by the user. Consequently, whilst software is available that automate the retrieval process on the user's client device which obscures, encrypts, signs and transmits the retrieved data to relying parties, such software achieves the privacy goals but not the tamperproof goals.

Relying parties currently have to choose between three non-satisfactory solutions:

a. a server side solution which guarantees data has not been tampered with by the user but requires the user to give up their privacy and credentials to a 3$^{rd}$ party (and many trusted entities, such as financial institutions, will not allow this);
b. An automated client solution which ensures user privacy and non-disclosure of credentials but cannot guarantee data has not been modified by the client.
c. All trusted parties changing their online systems and signing data prior to the data being given to the client (this is impractical, many trusted entities have no incentive to do this).

DEFINITIONS

The following definitions apply to terminology used in this patent specification:

A "Trusted Entity" is a person or organisation that holds information on behalf of a "subject entity", which information may be useful to verify matters associated with the subject entity, such as, for example, identification of the subject entity, qualifications associated with the subject entity, such as financial details or other qualifications, or any other matters. The trusted entity may be an organisation that requires verification of a subject entity to a relatively high degree, such as government body, a bank that holds an account of the subject entity, or other organisation. It could, however, be any organisation that holds information associated with the subject entity.

A "Subject Entity" is any person, including a real person or a legal person (such as an organisation, company, or the like) who is providing "trusted information" that is associated with them, such as information which may assist in identifying them, or information about their qualifications, such as bank account details or any other qualifications. It may be any information that is determined or required to be "trusted information".

A "Relying Entity" is a person (who may be a real person or a legal person, such as a company or other organisation) which requires the trusted information which is associated with the subject entity, which they may require for purposes associated with verifying the identity of the subject entity or other matters associated with the subject entity, such as qualifications, such as bank accounts, other qualifications, or any other matters.

"Trusted Information" is information that a relying entity can trust is correct, and may have been certified by a certifying service.

A "Certifying Service" provider (also termed in this document a "Reliant Service Provider") is the provider of the certifying service which facilitates certifying of a trusted information that can be relied on by the relying entity.

SUMMARY OF THE INVENTION

In accordance with a first aspect, the present invention provides a system for certifying information, comprising a certifying service computing apparatus, comprising a network communications interface enabling network communications from and to the computing apparatus, a processor configured to implement computing processes and a memory configured to store data, an information obtaining process configured to obtain information from one or more trusted entity computing apparatus, the trusted entity computing apparatus storing trusted information of subject entities, the information being obtained in a form such that the trusted information cannot be accessed by the certifying service computing apparatus, a selection process configured to select the trusted information from the obtained information, and a certification process configured to certify that the trusted information is from the trusted entity computing apparatus, and that the trusted information has not been modified.

In an embodiment, the trusted information cannot be accessed by the certifying service computing apparatus because the obtained information is encrypted and the memory is configured to store the information in encrypted form, that is not able to be decrypted by the certifying service computing apparatus.

The certification service computing apparatus, therefore, in at least an embodiment is able to provide certification of trusted information for a relying entity who may wish to use the certified trusted information for a verifying purpose. For example, the verifying purpose may be to verify the identity of the subject entity. It may be to verify a qualification of the subject entity, such as the status of their bank account, their nationality or citizenship or any other qualification. It may be required to verify any other matter associated with the subject entity.

The certifying service computing apparatus may be administered by a certifying service provider.

In at least an embodiment, the system has the advantage that trusted information may be sourced from any trusted entity (a trusted entity may administer the trusted entity computing apparatus). The subject entity and relying entity may agree on the trusted information required to be certified, and the trusted entities from which the information should be obtained.

In an embodiment, the trusted entity does not need to implement any special processes or architecture over and above what they may already have. For example, where the trusted entity is a bank, it does not need to implement any special procedures or infrastructure to facilitate the system of the present invention.

In an embodiment, where more than one trusted entity may be accessed, the subject entity and relying entity have the choice of which trusted entity to obtain the trusted information from, and what trusted information to obtain. In an embodiment, the present invention has the advantage of providing a secure, private mechanism for one party to provide information and data sourced from a trusted entity, to a second party (relying entity), where the second party can be certain the information and data originated from the trusted entity and has not been modified since retrieval. The subject entity does not have to disclose any authentication credentials to the relying entity. That is, they do not have to allow the relying entity or certifying service provider access to their passwords or other credentials to enable the relying entity to enter the trusted entity's computing system. Trusted entities do not have to make any changes to their systems. This embodiment therefore provides a solution that can utilise any existing or future trusted entity in the world that the relying entity and subject entity agree on as trusted.

In an embodiment, the certifying service computer apparatus comprises a proxy computer apparatus. The communication session between a subject entity computing apparatus and the trusted entity computing apparatus is routed via the certifying service computing apparatus. The certifying service computing apparatus is configured to obtain the information from the data as it is routed. The information is cached in the memory of the certifying service computing apparatus.

In an embodiment, storing data in encrypted form has the advantage that a certifying service provider (who may administer the certifying service computing apparatus) has no access to the information. It remains encrypted on the certifying service computing apparatus. In an embodiment, the subject entity selects which information they wish to be certified. The encrypted information corresponding to the subject entity's selected information is accessed in its encrypted form on the Certifying service computing apparatus and certified, in an embodiment by a digital signature of the certifying service provider. The encrypted, signed trusted information is provided to the subject entity. The signed trusted information will also include the identification of the trusted entity (in an embodiment a Digital Certificate of the trusted entity). The subject entity is provided with the appropriate keys to be provided to the relying entity for decryption of the trusted information.

In a further embodiment, the system may comprise a verification service computing apparatus. The verification service computing apparatus may be administered by a verification entity. In this embodiment, the verification service computing apparatus may receive a subject entity selection of which information is wished to be certified. The selection is provided to the certifying service computing apparatus, from the verification service computing apparatus. The certifying service computing apparatus then provides the signed trusted information to the verification service computing apparatus, which may then decrypt the trusted information, check its signature and provide the resulting data to the relying entity. A plurality of verification service entities may exist, administering their respective plurality of verification service computing apparatus. The verification service entities may use a single certifying service computing apparatus.

In an embodiment, all of the obtained information may be selected as the trusted information, or a portion of the obtained information may be selected as the trusted information.

In accordance with a second aspect, the present invention provides a subject entity computing apparatus for operation with a system in accordance with the first aspect, the subject entity computing apparatus comprising a client verification application which is configured to direct a request for certified trusted information via the certifying service computing apparatus, to establish a communications session with a trusted entity computing apparatus.

In accordance with a third aspect the present invention provides a system for providing certified trusted information, comprising a system in accordance with the first aspect of the invention and an apparatus in accordance with the second aspect of the invention.

In accordance with a fourth aspect, the present invention provides a verification service computing apparatus, for facilitating certification of information, the apparatus comprising a network communication interface enabling network communications from and to the computing apparatus, a processor configured to implement computing processes and a memory configured to store data, and a verification process arranged to receive identifying data from a subject entity computing apparatus, the identifying data identifying information selected by a subject entity for certification, the verification process being arranged to utilise the identifying data to obtain, the selected information from a certifying service computing apparatus, and make the selected information available to a relying entity.

In an embodiment, the identifying data includes decryption data enabling decryption of the selected information, which, in an embodiment, is in an encrypted form when provided by the certifying service computing apparatus. The decryption data may comprise SSL session keys, which may be provided by a subject entity computing apparatus.

In an embodiment, the identifying data comprises label data arranged to identify the selected information. In an embodiment, the label data comprises map data arranged to be utilised by the certifying service computing apparatus to identify the selected information which is mapped by corresponding map data.

In accordance with a fifth aspect, the present invention provides a system for providing certified trusted information, comprising a system in accordance with the first aspect of the invention and an apparatus in accordance with the fourth aspect of the invention.

In an embodiment, the system further comprises an apparatus in accordance with the second aspect of the invention.

In accordance with a sixth aspect, the present invention provides a method for certifying information about a subject entity, where the subject entity has trusted information associated with them, which is stored at one or more trusted entity computing systems, comprising the steps of a certifying service provider obtaining information from one or more trusted entity computing systems, the information being obtained in a form such that the trusted information cannot be accessed by the certifying service provider, selecting trusted information from the obtained information, certifying the trusted information as being from the trusted entity computing system, and that the trusted information has not been modified.

In accordance with a seventh aspect, the present invention provides a system for certifying information, comprising a certifying service computing apparatus, comprising a network communications interface enabling network communications from and to the computing apparatus, a processor configured to implement computing processes and a memory configured to store data, an information obtaining process configured to obtain information from the one or more trusted entity computing apparatus, the trusted entity computing apparatus storing trusted information of subject entities, a selection process configured to select the trusted information from the obtained information, and a certification process configured to certify the trusted information is from the trusted entity computing apparatus.

In accordance with an eighth aspect, the present invention provides a system for certifying information, comprising a certifying service computing apparatus, comprising a network communications interface enabling network communications from and to the computing apparatus, a processor configured to implement computing processes and a memory configured to store data, an information obtaining process configured to obtain information from the one or more trusted entity computing apparatus, the trusted entity computing apparatus storing trusted information of subject entities, a selection process configured to select the trusted information from the obtained information, a certification process configured to certify that the trusted information has not been modified.

In accordance with a ninth aspect, the present invention provides a system for certifying information, comprising a certifying service computing apparatus, comprising a network communications interface enabling network communications from and to the computing apparatus, a processor configured to implement computing processes and a memory configured to store data, an information obtaining process configured to obtain information from one or more trusted entity computing apparatus, the trusted entity computing apparatus storing trusted information of subject entities, the information being obtained in a form such that the trusted information cannot be accessed by the certifying computing apparatus, and a selection process configured to select the trusted information from the obtained information.

In accordance with a tenth aspect, the present invention provides a computer program, comprising instructions for controlling a computer to implement a system or apparatus in accordance with any one of the first to ninth aspects of the invention.

In accordance with an eleventh aspect, the present invention provides a non-volatile computer readable medium, providing a computer program in accordance with the tenth aspect of the invention.

In accordance with a twelfth aspect, the present invention provides a data signal, comprising a computer program in accordance with the tenth aspect of the invention.

BRIEF DESCRIPTION OF THE FIGURES

Features and advantages of the present invention will become apparent from the following description of embodiments thereof, by way of example only, with reference to the accompanying drawings, in which.

DETAILED DESCRIPTION OF EMBODIMENTS OF THE INVENTION

Figure 1:
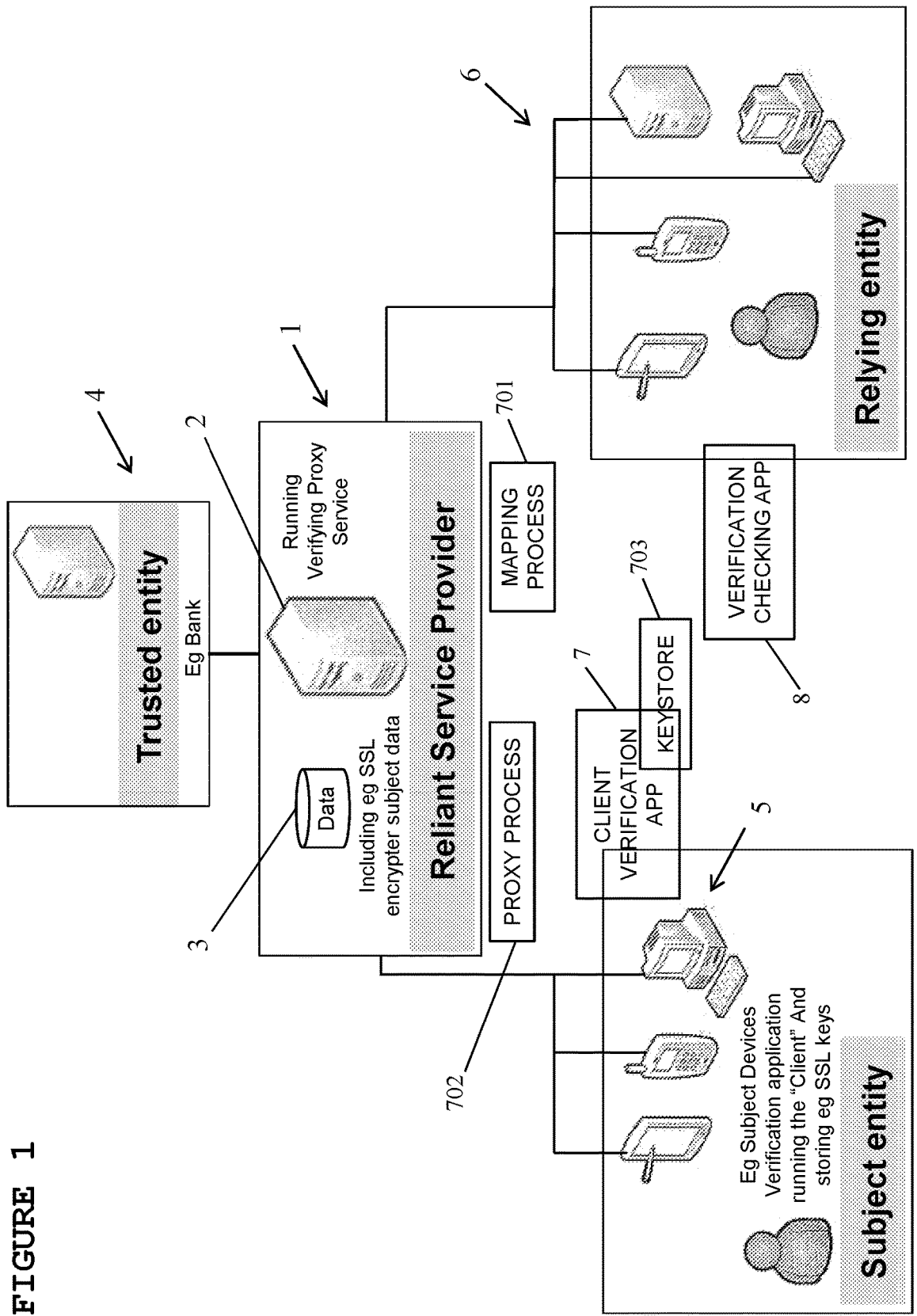
FIG. 1 is a schematic diagram of a system for certifying information in accordance with an embodiment of the present invention.

Referring to FIG. 1, there is schematically illustrated a system for certifying information, in accordance with an embodiment of the present invention. This embodiment comprises a certifying service computing apparatus 1, which in this example is also known as a "Reliant Service Provider" (RSP) computing apparatus. In this example, the RSP computing apparatus 1 comprises a server type computing apparatus 2 and associated database 3.

The RSP computer 1 (which will be described in more detail later with reference to FIG. 2) is arranged to implement computer processes, which may be in the form of software applications running on the computer hardware. Processes may be in any other form, including being implemented by dedicated hardware, or a mixture of dedicated hardware and software.

In this embodiment, the RSP computer 1 implements an information obtaining process which is arranged to obtain information from one or more trusted entity computing systems 4. Only one trusted entity computing system is shown in FIG. 1, but it will be appreciated there may be many trusted entity computing systems which the RSP computer 1 may have access to.

The RSP computer 1 implements a selection process which is arranged to receive a request for trusted information and to select the trusted information from the information which is obtained from the trusted entity and stored in memory 3. It also includes a certification process for certifying the trusted information as being from the trusted entity computing apparatus.

The request for trusted information may originate from a subject entity computing apparatus 5. The subject entity computing apparatus may be any apparatus, such as a server, a PC, a laptop, or any other type of computing device, including a mobile device, such as a Smartphone or tablet.

As will become apparent from the following description, the certified trusted information may be provided to a relying entity computing apparatus 6, which may be any type of computer, including a PC, server, laptop, mobile device, such as a Smartphone or tablet or any other computing device. Many subject entities and many relying entities may use the certification service provided by RSP computer 1.

Figure 2:
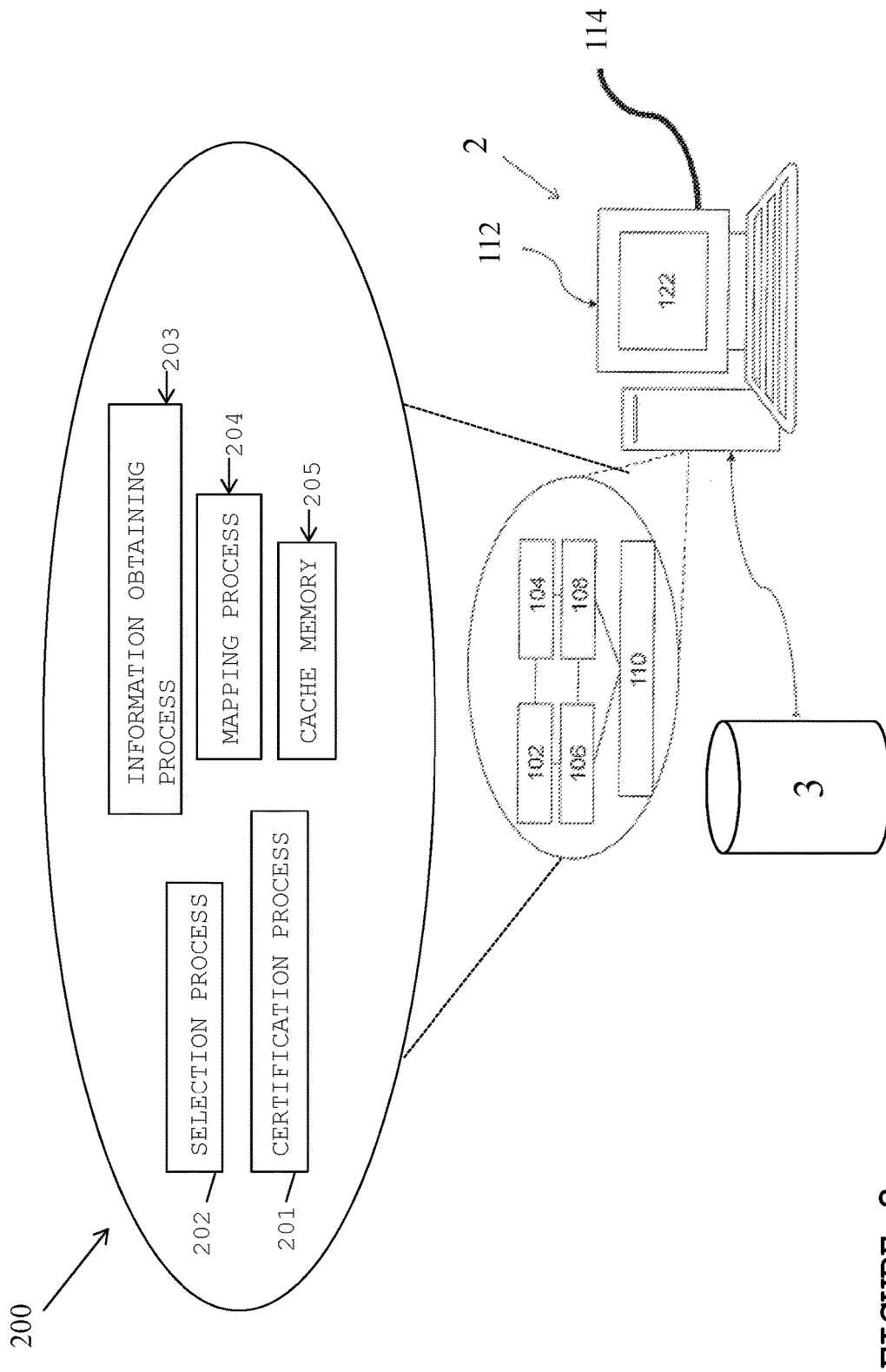
FIG. 2 is a schematic diagram of a certifying service computing apparatus for use with an embodiment of the present invention.

Referring to FIG. 2, there is illustrated in more detail a type of apparatus that may be used as the RSP computing apparatus.

The RSP 1 may be implemented by any computing architecture, including a standalone PC, client/server architecture, "dumb" terminal/mainframe architecture or any other appropriate architecture.

Referring to FIG. 2, there is shown a schematic diagram of a certifying service computing apparatus, which in this embodiment comprises a server 2. The server 2 comprises suitable components necessary to receive, store and execute appropriate computer instructions. The components may include a processing unit 102, read-only memory (ROM) 104, random access memory (RAM) 106, input/output devices such as disk drivers 108, input devices 110 such as an Ethernet port, USB port, etc. A display 112 such as liquid crystal display, a light emitting display or any other suitable display, and communications links 114 for communicating with external networks such as the internet, are also provided. The server 2 includes application instructions for implementing computer processes, that may be included in ROM 104, RAM 106 or disk drives 108 and may be executed by the processing unit 102. There may be provided a plurality of communication links 114 which may variously connect to the networks. The plurality of communication links 114 may be connected to the external networks through a telephone line, optical fibre, wireless connection or other type of connection.

The server 2 may also have a suitable operating system which resides on the disk drive 108 or ROM 104. A database 3 may be formed from the computer memory 104, 106, 108 or may be separate. An interface 122 provides a means by which an administrator or other user may input commands, instructions or requests of the server 2 for execution or processing. The interface 122 may be implemented with other input devices, such as keyboards, mouse or in another example embodiment interface 122 may be arranged to receive inputs, requests or data through a network connection.

The network connection 114 enables connection to trusted entities, relying entities and subject entities via the networks.

As discussed above, the RSP computer 2 may be implemented by any known computing architecture. Implementation of part or all of the computer 2 may be hosted remotely, such as by the "cloud".

The RSP computer 1 provides a certifying service for certifying trusted information required by a relying entity, on behalf of a subject entity. The RSP computer 1 acts as a proxy, and is arranged to route communications sessions between the trusted entity computer 4 and subject entity computer 5 via the RSP 1. It has the functionality to temporarily store encrypted data in the memory 3, digitally sign the data and verify the origin of the data, i.e. as being from the trusted entity 4. The RSP 1 cannot access the encrypted content so has no knowledge of the information, and fully respects point to point encryption between the subject entity 5 and the trusted entity 4.

A client verification application 7, which is a computer process implemented by software on the subject entity 5 hardware, is provided with a mechanism to access the network e.g. the Internet through a built in program, e.g. a "browser". It has the ability to route all Internet requests to the RSP 1. The client verification application 7 also has the functionality to store any private session (or other applicable) encryption keys. The keys have the ability to decrypt the relevant "encrypted stored data" stored on the RSP memory 3.

A protocol is also implemented by this embodiment, which is designed to facilitate the communications between the client verification application 7 and the RSP 1, to facilitate use of existing protocols used between clients and servers such as, for example, SSL.

A verification checking application 8 is implemented on a relying entity 6 computing device. The verification checking application 8 may facilitate verification of the certified trusted information by the relying entity 6.

In more detail, referring again to FIG. 2, the functionality of the RSP computer 1 in this embodiment is implemented by the hardware described above with software applications comprising a number of functional modules 200 arranged to implement verification and certifying of information required by a relying entity. The term "module" as used here relates to a functional module which may be implemented in either software or hardware, but can operate either independently of one another or in combination with other modules to provide the functionality of the system. It should be understood that the defined functional modules may or may not be implemented as separate software/hardware modules, sub-routines or the like. Although they could be separate, they may be integrated in a holistic software/hardware system.

In this embodiment, modules of the RSP computer 1 include an information obtaining process 203. The information obtaining process is arranged to obtain and store the encrypted data being routed between the trusted entity computer 4 and subject entity computer 5 during a communications session where the RSP computer 1 operates as a proxy. The encrypted information is stored in cache memory 205. The cache memory may be formed as part of the memory 3, or as part of the RAM 106 or both.

A mapping process 204 is associated with the information obtaining process 203, and is arranged to map the encrypted information as it is stored in the cache memory 205, by labelling the encrypted information in portions or blocks. In an embodiment, the encrypted information is cached and labelled as it is obtained by the information obtaining process 203.

In one embodiment, the mapping process may utilise the standard hash (MD 5/SHA) of the SSL/TLS protocol, which is implemented to ensure consistency of the packets (so that they do not get corrupted during transmission from client to service and vice versa). In this embodiment, the hash is used as an index/identifier for each request. The encrypted data stored in the cache memory 205 will be indexed for each entry for the given user with the hash. A subject entity passing the reliant service provider the username and hash will result in the RSP 1 being able to identify which stored encrypted data corresponds to that hash. In an embodiment, the mapping process will also sequentially number the packet to avoid the very small likelihood of more than one hash for a given user being the same even though the data is different. The mapping is done on a request basis e.g. each time that the subject entity computing apparatus 5 makes a request for data, the data related to that request will be stored with the relevant identifier and hash.

In one embodiment, the client verification application 7 on the subject entity computing apparatus 5 includes a complimentary mapping process 701 to the mapping process 204, which applies the same labels to the same data. For example, the same hash and user identifier is applied by the CVA 7, as by the mapping process 204. An equivalent map to that stored with the encrypted data in cache memory 205, is therefore also stored in the client verification application 7 on the subject entity computing apparatus 5. Using the maps, therefore, the subject entity computing apparatus can communicate which particular information it requires certifying for the relying entity.

It will be appreciated by the skilled person that the mapping process may be done in many different ways, and, is not limited to the process described above. Any way of labelling the encrypted information which can be used to identify the encrypted information to be the trusted information, can be utilised.

The client verification application 7 also includes a proxy process 702. When the subject entity computer 5 uses the client verification application 7 to access the trusted entity 4 to obtain information, the proxy process 702 automatically directs the communication session via the RSP computer 1 as the proxy. This is done in a known manner, similar to known proxy processes. In this embodiment, the process may include a mechanism where the CVA 7 browser initially contacts a separate server where it will be securely passed the proxy URL to use. An alternative embodiment has the proxy URL (for the reliant service provider 1) embedded in the CVA code. The CVA specialised functionality has its own implementation of the low level connection stack including SSL, allowing the additional functionality to enable it to fully adhere to SSL while directing the traffic via the proxy. All web requests made by the CVA 7 will use the low level stack and direct all requests to go via the proxy server.

Again, it will be appreciated that there may be other ways of directing the subject entity computer 5 to communicate via the RSP 1, and the invention is not limited to the particular implementation described in the preceding paragraph.

The RSP computer 1 implements a selection process 202 which is arranged to select the information to be secured and certified. The client verification application 7 provides the map labels for the location of the information that is to be selected, when the subject entity selects that information on their computer 5. For example, they may select account information from their bank account. The map labels for the account information data are then provided to the selection process 202. The selection process uses these map labels to select the corresponding encrypted information (which is correspondingly labelled) from the cache memory 205.

A certification process 201 is then arranged to digitally sign the selected encrypted information to certify that it is the correct information and that it is from the reliant service provider. The certification process 201 also requests identifying information from the trusted entity 4, such as the SSL certificate. The selected encrypted information is therefore signed by the reliant service provider and includes the relevant identification information of the trusted entity.

The subject entity computing apparatus 5 includes a keystore 703. This keystore stores the relevant keys for the SSL session between the subject entity computer 5 and the trusted entity computer 4. In one embodiment, the selected encrypted information, with certification and identification of the trusted entity is provided to the client verification application 7. The client verification application 7 may then provide it to a relying entity, together with the appropriate SSL keys so that the relying entity can receive the certified information and decrypt it.

In another embodiment, the certified encrypted data is provided to a separate verification service computer, that also receives the SSL keys from the subject entity computer 5. The relying entity 6 then can obtain the information from the verification service computer.

Figure 3:
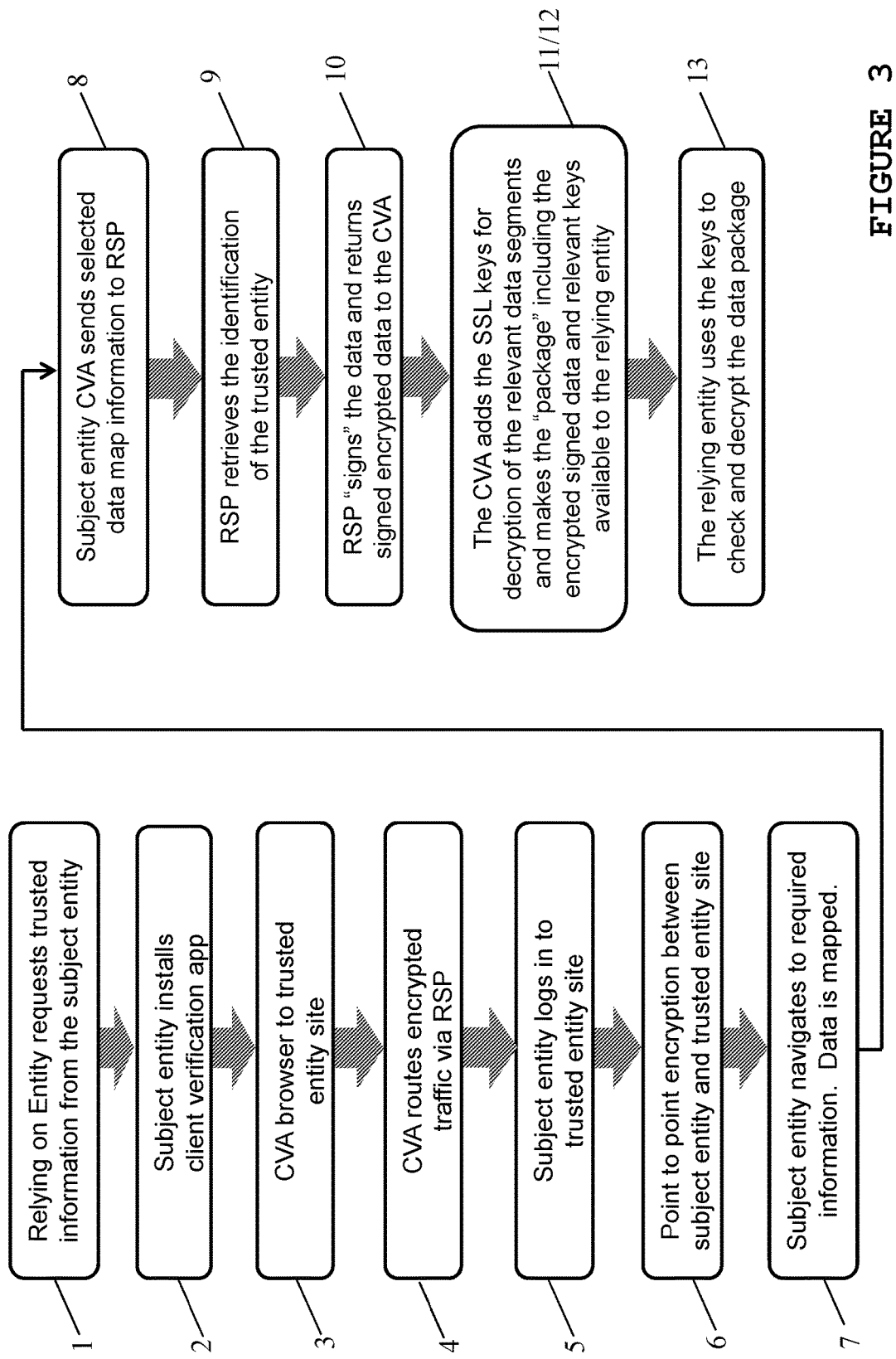
FIG. 3 is a flow diagram illustrating operation of a system in accordance with an embodiment of the present invention.

With reference to FIG. 3, operation of a system for certifying information in accordance with an embodiment of the present invention will now be described.

1. The relying entity makes a request (in any known way) to a subject entity that the subject entity is required to provide some private proven trusted information related to the subject entity e.g. proof that the subject entity's name, address, date of birth is what has been claimed by the subject entity. The relying entity provides the subject entity with a list of trusted entities that the relying identity considers acceptable to the relying entity. This request may be implemented in any known way. For example, the relying entity and the subject entity may communicate via a website, by email, telephone, or any other known way. They may agree on the trusted information that will satisfy the relying entity, and on the trusted entities that will satisfy the relying entity. There may be one or more trusted entities and one or more types of trusted information.

2. The subject entity downloads the client verification application to their device of choice e.g. a Smartphone or a computer or tablet. The client verification application 7 is available to the subject entity through any standard mechanism e.g. a web site download or an application store e.g. the Apple™ appstore, or as a JavaScript, XML, Ajax style application that runs inside the user's standard browser.

3. The subject entity runs the client verification application on their chosen device and navigates to a "trusted entity" site 4 acceptable to the "relying entity".

4. The client verification application 7 routes the encrypted traffic to the trusted entity server 4 via the RSP 1 in the same way as known proxy services operate.

5. The subject entity logs into the trusted entity 4 using their standard login credentials.

6. The communication between the client verification application 7 and the trusted entity 4 follows the exact protocol that would be used were the subject entity to be using their regular browser to access the trusted entity site. E.g. most "trusted entity" sites would use SSL to provide a secure point to point encrypted channel between "trusted entity server" 4 and the "subject entity" client browser. This embodiment of the invention in no way interrupts or subverts this known point to point encryption.

7. Once logged in, the subject entity navigates through the site to where the relevant data is available. All the encrypted proxy data is cached 3 on the RSP 1 together with the information identifying which trusted entity server it came from. It should be noted that the information cached on the RSP 1 is fully encrypted and the RSP 1 never has any keys to decrypt the data so the caching in no way exposes the subject entity and their data to any increased risk of interception over the standard mechanisms normally used between the RSP 1 and the subject entity browser.

As the data is routed via the RSP 1, the RSP labels (maps) the data that is being cached.

The client verification application implements a mapping process 101 which is the same as the mapping process 204 implemented by the RSP 1.

The RSP 1 stores information as inbound SSL encrypted information originating from the trusted entity (and, if required, the Subject Entity) is read off the socket. It is loaded into memory and written into the cache database 5. It may be stored on hard disk. Each packet of information is indexed e.g. numerically for a given user. The same algorithm (applied by the CVA 7) indexes the corresponding item on the client verification application 7.

The subject entity is able to see the decrypted data on their device as it is decrypted for them by the Client Verification App.

8. Once the subject entity has accessed the targeted information, the subject entity selects a "secure data" option in the CVA 7 browser. The subject entity selects the information that it wishes to be provided to the relying entity. This causes the client verification application to send the relevant identification map (based on the data labelling which occurs during the process of Step 7) to the RSP 1 such that the RSP 1 can identify the encrypted data as being the data that the subject entity wishes the certifying service provider to sign and return to the subject entity via the CVA 7. Generally, the subject entity will only select a portion of the data that has been routed to them via the proxy. The proxy stores all the data that has been routed via it, in encrypted form. The relevant identification map generated for the selected data enables the RSP 1 to identify the portion of encrypted data that is required.

9. The RSP 1 makes a request to the trusted entity 4 server i.e. to the IP address of the initial data request that provided the relevant encrypted data and retrieves the identifying information from the trusted entity 4 server e.g. the SSL certificate which contains all the relevant details relating to the trusted entity's credentials e.g. the registered name of the corporation, the date the certificate was issued and when it will expire as well as the public key of the trusted entity's certificate and the IP address of the server this certificate was retrieved from.

10. The RSP 1 signs the relevant identified encrypted data and the retrieved trusted entity identifying information with the private key of the RSP and returns the signed and encrypted data to the CVA 7.

The CVA 7 adds the keys (e.g. the SSL keys) to decrypt the relevant data segments to the signed and encrypted data returned by the RSP 1.

11. The CVA 7 makes the retrieved encrypted signed data, together with the key(s) to decrypt the relevant data segments available to the subject entity (or alternatively stores it and later makes it available to the relying entity).

The subject entity can then transmit the signed encrypted data together with the key(s) to decrypt the data to the relying entity using any appropriate mechanism e.g. email or PGP encrypted email or via a server portal or by sending the data on a CD, USB key etc.

12. The relying entity is provided with the encrypted data package together with the keys to decrypt the data and the RSP 1's public key to check the digital signature.

13. The relying entity then uses the subject entity encryption keys e.g. SSL keys, to decrypt and process the data in the package, after it has checked the digital signature using the RSP's public key. This will also enable it to check the digital certificate of the trusted entity. The relying entity then obtains the data in a decrypted and readable form. The relying entity can be fully confident of the data's origin and that it has not been modified in any way by the subject entity or anyone else.

A verification checking application 8 may reside on the relying entity device 6 so that the relying entity may do all the checking at their device 6. In an alternative embodiment, the RSP 1 (or another independent service provider) may provide a portal which enables a relying entity to access a verification checking application of the portal and verify and/or decrypt the certified trusted information.

Figure 4:
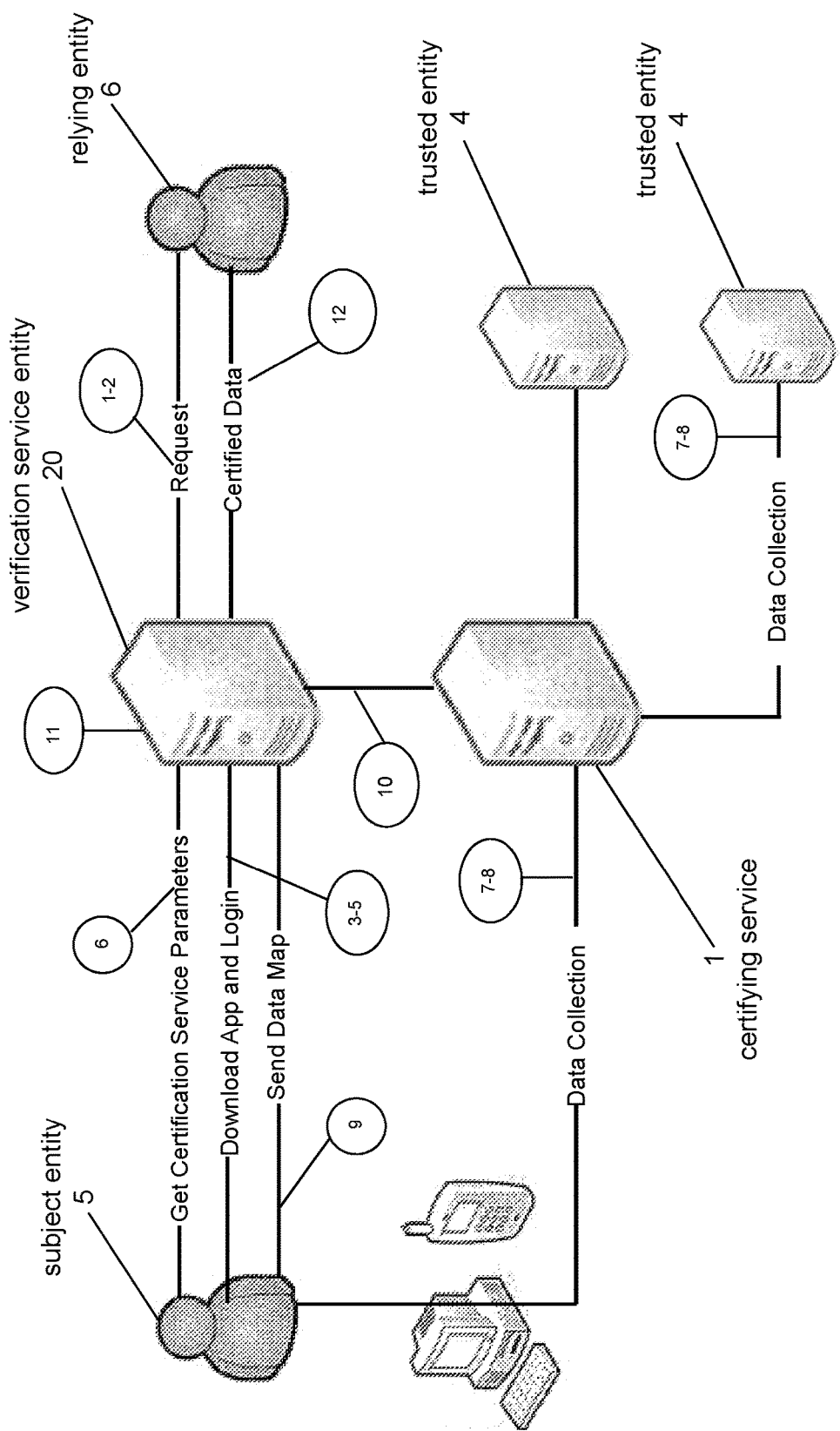
FIG. 4 is a schematic diagram of a system for certifying information in accordance with a further embodiment of the present invention.

FIG. 4 illustrates a further embodiment of the invention. This embodiment also comprises a certifying service computing apparatus 1, trusted entity computing apparatus 4, subject entity computing apparatus 5 and relying entity computing apparatus 6. In addition, this embodiment comprises a verification services entity which administers a verification service computing apparatus 20. The verification service entity will usually be separate from the certifying service provider, although in embodiments they could be the same. The verification service facilitates a service to the relying entity to obtain trusted information of the subject entity.

As with the above embodiment, the certifying service computing apparatus operates as a proxy routing communications between the subject entity and the trusted entity computing apparatus. Functionality is the same as discussed above in the previous embodiment. The verification service computing apparatus facilitates communication between the reliant entity and the subject entity, and facilitates distribution of certified trusted information to the relying entity.

In embodiments, there may be a plurality of verification service providers and associated verification service computing apparatus 20, operating with the same certifying service computing apparatus.

Figure 5:
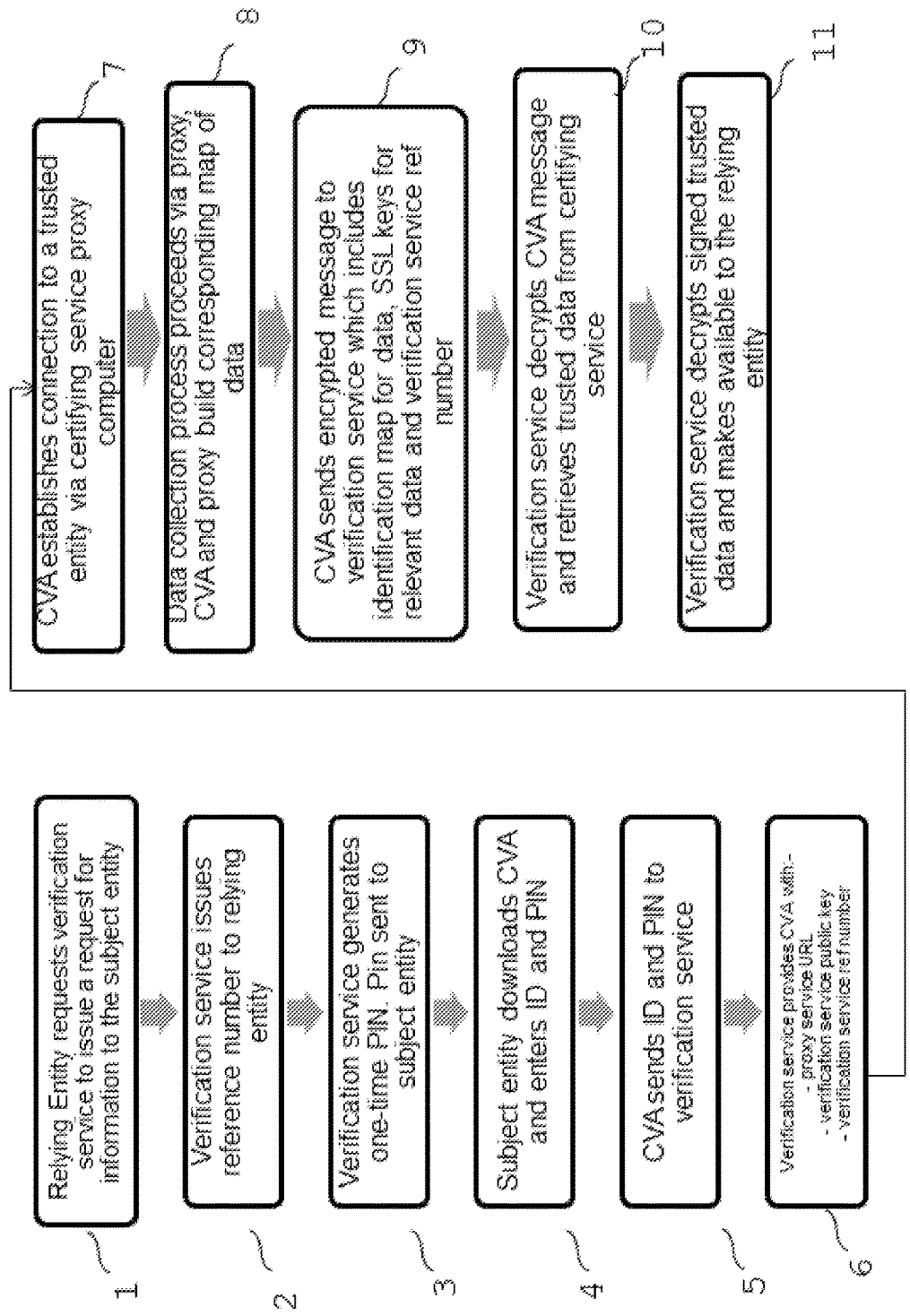
FIG. 5 is a flow diagram illustrating operation of a system in accordance with the embodiment of FIG. 4.

Operation of the embodiment of FIG. 4 will now be described with reference to the flow diagram of FIG. 5.

Step 1. The relying entity, via their computing apparatus, requests the verification service computing apparatus 20 to issue the subject entity with a request to provide required data/documentation from a trusted party. The relying entity supplies the subject party's contact details (e.g. email/telephone).

Step 2. The verification service computing apparatus issues a Reference number to the relying entity (any identifier, token could be used, and the invention is not limited to a numeric reference).

Step 3. The verification service computing apparatus generates a one time PIN (e.g. four digits) for the transaction and sends it to the subject entity computing apparatus. Alternatively, the PIN is sent to the relying entity computing apparatus who will forward it on to the subject entity. Communications to the subject entity may be any communications pathway, e.g. SMS, email. The communication will include a request to download the client verification app 7 (as per the above embodiment). Note that any alternative identifier or token could be used, and the invention is not limited to a PIN.

Step 4. The subject entity computing apparatus downloads the CVA 7 from the verification service computing apparatus 20, and enters their ID (e.g. email/phone number or other ID) and the PIN.

Step 5. The CVA 7 sends the identification and PIN to the verification service computing apparatus 20).

Step 6. The verification service computing apparatus provides the CVA with the following:

a) the proxy service (certifying computing apparatus) URL.
b) the verification service Public key.
c) the verification service Reference number.

Step 7. The CVA establishes the connection to the trusted party 4 via the certifying service computing apparatus 1.

Step 8. A Data collection process proceeds as in the previous embodiment, via the proxy service. The CVA and certifying service computing apparatus each build a corresponding map of SSL encrypted components. The map has identifier that is unique to the data collection process and both the CVA and certifying service computing apparatus store this unique identifier with the respective maps.

Step 9. The CVA sends a message to the verification service computing apparatus which is encrypted using a verifying service public key. The message from the CVA contains:

a) an identification data map for the documents that the relying entity requires.
b) the CVA generated data encryption keys (e.g. SSL) for only the required data and the data map (note: not the keys for all the data. This ensures that the verification service (and reliant party) can only access the information that the subject entity has permitted them to see).
c) the verification service Reference number.
d) The unique map identifier Step 10. The verification service computing apparatus decrypts the message from the CVA with its Private Key. It retrieves the required trusted data from the certifying service computing apparatus (signed with the certifying service computing apparatus Private Key, as per the above embodiment) based on the identification data map and unique map identifier from the CVA.

Step 11. On receiving the data, the verification service then:

a) verifies the certifying service signatures with the certifying service public key
b) decrypts the trusted party data with the CVA SSL keys.
c) the verification service then provides the relying entity with the certified data.

In this embodiment therefore, the verification service entity does have access to the trusted information (but only the specifically selected trusted information not all the session information and not the subject entity's trusted provider's login credentials). The trusted information is not directly provided from the subject entity to the relying entity. The verification service has the advantage, however, that it facilitates the system. The verification service is likely to be a reliable and trusted provider.

Figure 6:
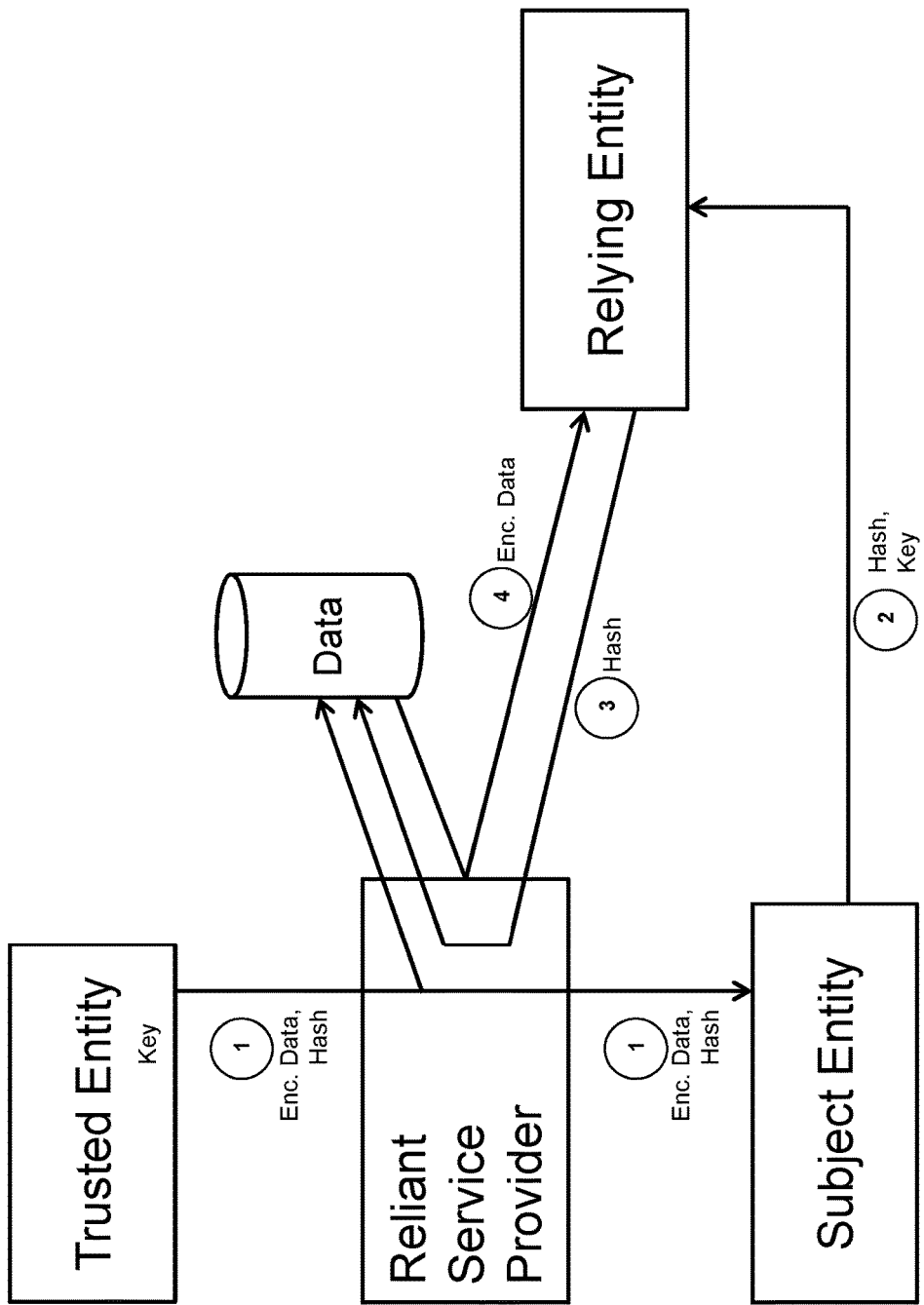
FIG. 6 is a schematic diagram illustrating flow of data in a system in accordance with an embodiment of the present invention.

FIG. 6 is a schematic diagram illustrating a general flow of information in an embodiment of a system in accordance with the present invention. The following is a summary of the flow of data in a process and system in accordance with this embodiment.

(1). Encrypted Data accompanied by the Hash travels from Trusted Entity to Subject Entity passing through Reliant Service Provider that stores them in the data storage (mapped/indexed by the hash). The Reliant Service Provider never has access to the decryption key, therefore it cannot decrypt the data. (The communication between Trusted entity and Subject entity follows standard encryption implemented using SSL/TLS protocol and the relevant encryption algorithms and keys that such standard SSL/TLS protocols utilise. SSL/TLS is known and specifically designed to prevent any entity/server through which the communication passes whilst in transit between the two relevant communicating parties from having access to the key to decrypt or access in any way the decrypted data.) The key used to ultimately encrypt/decrypt data in SSL/TLS (ie session key) is generated for every communication request—this is a session key. It is held in memory by both the Trusted Entity and the Subject Entity while processing each specific request. After the communication is completed, normally both parties then discard the key. In this embodiment, the Subject entity however stores the session key on the subject devices memory, indexed by an identifier that matches the identifier against which the Reliant service Provider stores the encrypted packet. (This is required for later use to allow the relying entity to decrypt the relevant encrypted data that they have been given permission by the Subject Entity to decrypt).

(2). Subject Entity passes the Key and the Index/identifier e.g. Hash to the Relying Entity (in other words, gives an authorization to access the data from Reliant Service Provider).

(3). Relying Entity queries Reliant Service Provider with the Index/Identifier e.g. Hash.

(4). Reliant Service Provider responds with the corresponding Encrypted Data. Now, Relying Entity can decrypt the data. As the data has been received from the trusted Reliant Service Provider (as opposed to non-trusted Subject Entity), the data is trusted.

In this embodiment, therefore, the relying entity receives the identifier (e.g. map) and key from the subject entity. The relying entity then provides the map identifier to the RSP and receives the encrypted data from the RSP.

In yet a further embodiment, the CVA application 7 on the subject entity computing device may send the decrypted data, the encryption key(s) and the map identifier to the relying entity. The relying entity, via the verification checking application, then encrypts the data with the key to create the relevant MD 5/SHA Hash (or equivalent identifying data) and sends this identifying data to the reliant service provider computer. The RSP then checks if the identifying data (Hash) matches the identifying data (Hash) it has stored for that data. If it matches, then the RSP can confirm to the subject entity that the data provided by the subject entity to the relying entity has not been tampered with and can be trusted.

In the above embodiments, standard available encryption applications, such as SSL are taken advantage of to ensure that the RSP 1 does not have access to the information. Further, standard known trustworthy certification processes, such as digital signatures, are also used. The current embodiment therefore does not require provision of any further complex infrastructure.

It will be appreciated, however, that other encryption algorithms or applications may be utilised to implement other embodiments of the present invention, as could other certifying applications or techniques. The present invention is not limited to SSL or conventional digital signatures or certificates.

It will be appreciated that embodiments of the present invention may be implemented by a variety of hardware and software architecture. General purpose computers may be programmed to implement embodiments of the process. Hardware architecture is not limited to general purpose computers or servers, but any architecture could be implemented, including client-server architecture, central processing unit-terminal architecture or any other architecture. The system may be implemented utilising mobile devices, such as tablet computers and laptop computers, or dedicated bespoke architecture. Software may be used to program processor(s) to implement embodiments of the invention. Programmable hardware may be used to implement embodiments, such as field programmable gate arrays, programmable gate arrays, and the like.

Where software is used to implement the invention, software can be provided on computer readable media, such as disks, or as data signals over networks, such as the Internet or any other way.

In embodiments, hardware architecture already pre-programmed to implement embodiments of the invention may be provided.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

The invention claimed is:

1. A system for certifying information, comprising a certifying service computing apparatus, comprising a network communications interface enabling network communications from and to the computing apparatus; a processor configured to implement computing processes and a memory configured to store data, the certifying service computing apparatus operating as a proxy for routing communications between a subject entity computing apparatus and a trusted entity computing apparatus, via the certifying service computing apparatus; an information computer obtaining process configured to obtain information from one or more trusted entity computing apparatus, the trusted entity computing apparatus storing trusted information of subject entities, the information being obtained in encrypted form and stored in the memory, the information obtaining process obtaining the information from the routed communications between the subject entity computing apparatus and the trusted entity computing apparatus; a selection computer process configured to select the trusted information from the obtained information, the selection process being configured to receive and process a request for the trusted information from the subject entity computing apparatus, the request including map information identifying the location of the selected encrypted trusted information within the obtained information; and a certification computer process configured to certify that the trusted information is from the trusted entity computing apparatus, and that the trusted information has not been modified.

2. The system in accordance with claim 1, wherein the information obtaining process is configured to cache the obtained information in memory as it is obtained.

3. The system in accordance with claim 1, wherein the certification process is arranged to obtain identification of the trusted entity computing apparatus.

4. The system in accordance with claim 3, wherein the obtained identification is a digital certificate of the trusted entity computing apparatus which then becomes part of the trusted information to form certified trusted information.

5. The system in accordance with claim 1, wherein the certification process is configured to sign the certified trusted information with a digital signature of the certifying service computer apparatus.

6. The system in accordance with claim 1, wherein the certification process is configured to make the certified trusted information available to the subject entity computing apparatus, whereby the subject entity computing apparatus can make the certified trusted information available to a relying entity.

7. The system in accordance with claim 1, wherein the certifying service computing apparatus is configured to make the certified trusted information available to a relying entity computing apparatus, whereby the relying entity computing apparatus can view the certified trusted information.

8. A system in accordance with claim 1, further comprising a subject entity computing, the subject entity computing apparatus comprising a client verification process which is configured to direct a request for certified trusted information via the certifying service computing apparatus of, to establish a communications session with a trusted entity computing apparatus.

9. The system in accordance with claim 8, wherein the client verification process is configured to make a request of the selection process, for trusted information.

10. The subject entity computing apparatus in accordance with claim 9, wherein the request comprises map information identifying the location of the requested trusted information in the obtained information.

11. The system in accordance with claim 9, wherein the client verification process is configured to provide decryption keys for decrypting the encrypted trusted information.

12. A non-transitory computer-readable medium, comprising instructions for controlling a computer to implement a system for certifying information comprising a certifying service computing apparatus, the system comprising a network communications interface enabling network communications from and to the computing apparatus; a processor configured to implement computing processes and a memory configured to store data, the certifying service computing apparatus operating as a proxy for routing communications between a subject entity computing apparatus and a trusted entity computing apparatus, via the certifying service computing apparatus; an information computer obtaining process configured to obtain information from one or more trusted entity computing apparatus, the trusted entity computing apparatus storing trusted information of subject entities, the information being obtained in encrypted form and stored in the memory, the information obtaining process obtaining the information from the routed communications between the subject entity computing apparatus and the trusted entity computing apparatus; a selection computer process configured to select the trusted information from the obtained information, the selection process being configured to receive and process a request for the trusted information from the subject entity computing apparatus, the request including map information identifying the location of the selected encrypted trusted information within the obtained information; and a certification computer process configured to certify that the trusted information is from the trusted entity computing apparatus, and that the trusted information has not been modified.

13. A method for certifying information about a subject entity, where the subject entity has trusted information associated with them, which is stored at one or more trusted entity computing systems, comprising the steps of a certifying entity obtaining information from one or more trusted entity computing systems in an encrypted form, selecting trusted information from the obtained information, and certifying the trusted information as being from the trusted entity computing system, wherein the step of obtaining the information comprises the step of the certifying entity routing network data traffic between a subject entity computing system and the trusted entity computing system via the certifying entity, and obtaining and storing the encrypted information from the routed data, and wherein the step of selecting the trusted information from the obtained information comprises the step of receiving a request for the trusted information from the subject entity computing apparatus, the request including map information identifying the location of the selected encrypted trusted information within the obtained information.

14. The method in accordance with claim 13, comprising the further step of the certifying entity receiving a request for selection of the trusted information from a subject entity or a relying entity.

15. The method in accordance with claim 13, wherein the step of certifying the trusted information comprises the step of certifying that the trusted information has not been modified.

16. The system in accordance with claim 1, further comprising a mapping process arranged to map the encrypted information stored in the memory, and label the encrypted information with stored map information, the map information provided in the request from the subject entity computing apparatus comprising complimentary labelling to the stored map information.

17. A system in accordance with claim 1, wherein the mapping process utilises the standard hash of the SSL/TLS protocol.

18. A method in accordance with claim 13, comprising the further step of mapping the stored encrypted information and labelling the encrypted information with stored map information, and the request from the subject entity computing apparatus comprising complimentary labelling to the stored map information.

19. A method in accordance with claim 18, wherein the step of mapping the encrypted information utilises the standard hash of the SSL/TLS protocol.

* * * * *